United States Patent [19]

Sasaki et al.

[11] Patent Number: 4,877,922
[45] Date of Patent: Oct. 31, 1989

[54] COMPOSITION EASILY DYEABLE WITH SUBLIMABLE DESPERSE DYE

[75] Inventors: Isao Sasaki, Hiroshima; Kenji Kushi, Ohtake; Nobuyoshi Taguchi, Ikoma, all of Japan

[73] Assignee: Mitsubishi Rayon Company, Ltd., Tokyo, Japan

[21] Appl. No.: 330,936

[22] Filed: Mar. 27, 1989

Related U.S. Application Data

[63] Continuation of Ser. No. 94,293, Sep. 8, 1987, abandoned.

[30] Foreign Application Priority Data

Sep. 10, 1986 [JP] Japan ................................ 61-211731

[51] Int. Cl.$^4$ ............................................. C08G 63/60
[52] U.S. Cl. .................................... 528/272; 528/274; 528/289; 528/300; 528/901; 525/305; 524/86; 524/91; 524/188; 522/6; 522/8; 522/10; 522/13; 522/35; 427/54.1; 428/357; 428/446; 428/480

[58] Field of Search ................ 528/272, 274, 289, 300, 528/901; 525/305; 522/6, 8, 10, 13, 35; 524/91, 86, 188; 427/54.1; 428/357, 446, 480

[56] References Cited

U.S. PATENT DOCUMENTS

| 4,315,848 | 2/1982 | Dexter et al. | 524/91 |
| 4,339,474 | 7/1982 | Kishida et al. | 427/54.1 |
| 4,367,245 | 1/1983 | Kishida et al. | 427/54.1 |
| 4,518,472 | 5/1985 | Kishida et al. | 204/159.15 |

Primary Examiner—John Kight
Assistant Examiner—S. A. Acquah
Attorney, Agent, or Firm—Oblon, Spivak, McClelland, Maier & Neustadt

[57] ABSTRACT

Disclosed is an easily-dyeable resin composition used in a sublimation type heat-sensitive transfer process. The composition comprises 100 parts by weight of a mixture composed of 40 to 95% by weight of a polyester resin and 5 to 60% of a crosslinking agent curable with active energy rays, and 0.01 to 12 parts by weight of a surface active agent selected from silicon-containing surface active agents and fluorine-containing surface active agents.

26 Claims, No Drawings

COMPOSITION EASILY DYEABLE WITH SUBLIMABLE DESPERSE DYE

This application is a continuation of application Ser. No. 094,293, filed on Sept. 8, 1987, now abandoned.

BACKGROUND OF THE INVENTION

(1) Field of the Invention

The present relates to an easily-dyeable resin composition to be used in a sublimation type heat-sensitive transfer process. More particularly, it relates to an easily-dyeable resin composition which can be utilized for a woven fabric to be printed by a heat transfer printing process, a plastic article, such as a film, a sheet or a lens, to be dyed by a heat-sensitive transfer dyeing process or a material to be used in a sublimation type heat-sensitive transfer recording process.

(2) Description of the Related Art

As the easily-dyeable composition to be used in the sublimation type heat-sensitive transfer process, there have been proposed a sheet composed of acrylic staple fibers treated with an alkylene carbonate and an ammonium salt, as disclosed in Japanese Unexamined Patent Publication No. 60-81,359, and a sheet composed of polyester staple fibers having an acidic group converted to an ammonium salt, as disclosed in Japanese Unexamined Patent Publication No. 60-112,494. These known compositions are dyeable with a sublimable cationic dye, and dyeing of these compositions is carried out under high-energy conditions. As the dyeable composition for a woven fabric, a methylol melamine resin composition is known. Although this composition can be dyed by the heat transfer printing method using a sublimable disperse dye, a high energy is necessary for dyeing and the color fastness of the obtained dyeing is poor.

With recent rapid developments in office automation, a color display has been widely adopted in office automation appliances such as a personal computer, word processor and office computer, and the demand for a practical utilization of the recording process using color signals has increased. Also, in the field of dry-type copying machines, the formation of color copies is urgently desired, and the sublimation type heat-sensitive transfer recording process is expected to be an excellent recording process providing hard color copies because this process is characterized in that the generation of noise is controlled, the handling, maintenance and control of a copying machine is very easy and the gradation can be easily expressed. However, the easily-dyeable material that can be used in the conventional sublimation type heat-sensitive transfer recording process as disclosed in Japanese Unexamined Patent Publication No. 60-112,493 is a material dyeable with a sublimable cationic dye, and the light stability thereof is poor and a high energy is necessary for dyeing.

SUMMARY OF THE INVENTION

It is a primary object of the present invention to provide an active energy ray-curable resin composition which can be easily dyed with a sublimable disperse dye even under low energy conditions and can be colored at a high density.

More specifically, in accordance with the present invention, there is provided a resin composition easily dyeable with a sublimable disperse dye, which comprises 100 parts by weight of a mixing composed of 40 to 95% by weight of a polyester resin and 5 to 60% by weight of an active energy ray-curable crosslinking agent, and 0.01 to 12 parts by weight of at least one surface active agent selected from the group consisting of silicon-containing surface active agents and fluorine-containing surface active agents.

DESCRIPTION OF THE PREFERRED EMBODIMENTS

The present invention will now be described in detail.

The polyester resin in the composition of the present invention is easily and sufficiently dyed with a sublimable disperse dye and acts as the binder of the composition, and thus, an indispensable component of the composition of the present invention.

As the polyester resin, there can be mentioned linear thermoplastic polyester resins obtained by polycondensation between a dicarboxylic acid and a diol, and unsaturated polyester resins obtained by polycondensation between an unsaturated polybasic acid having a reactive double bond and a polyhydric alcohol. In view of the solubility in an organic solvent, the dyeing ease and the light resistance, a linear thermoplastic polyester resin having a molecular weight of 2,000 to 40,000 and a crystallization degree not higher than 1%, which is obtained by polycondensation between at least one dicarboxylic acid and at least one diol, is especially preferred.

The amount of the polyester resin incorporated is 40 to 95% by weight, preferably 55 to 94% by weight, based on the total amount of the polyester resin and the crosslinking agent. If the amount of the polyester resin is smaller than 40% by weight, the density of the color provided by the sublimable disperse dye is low under low energy conditions. On the other hand, if the amount of the polyester resin exceeds 95% by weight, the amount of the crosslinking agent is reduced, and the non-blocking property to a color sheet (transfer paper) coated with the sublimable disperse dye becomes poor and sticking (i.e., blocking) of an article coated with the resin composition easily dyeable with the disperse dye and cured by the active energy ray to the color sheet is caused at the heat transfer step.

As specific examples of the linear thermoplastic polyester resin obtained by polycondensation between at least one dicarboxylic acid and at least one diol, there can be mentioned a polyester obtained from terephthalic acid, isophthalic acid, ethylene glycol and neopentyl glycol, a polyester obtained from terephthalic acid, isophthalic acid, ethylene glycol and a bisphenol A/ethylene oxide adduct, a polyester obtained from terephthalic acid, isophthalic acid, ethylene glycol and 1,6-hexanediol, a polyester obtained from terephthalic acid; isophthalic acid, sebacic acid, ethylene glycol and neopentyl glycol, a polyester obtained from terephthalic acid, sebacic acid, ethylene glycol and neopentyl glycol, and a polyester obtained from terephthalic acid, isophthalic acid, adipic acid, ethylene glycol and neopentyl glycol. These polyester resins may be used in the form of mixtures of two or more thereof. In order to improve the stability against light, heat, water or others, preferably two or more of these polyester resins are used in combination. For example, when two polyesters A and B are used, preferably the A/B weight ratio is from 20/80 to 80/20.

It will be obvious that instead of terephthalic acid or isophthalic acid, an ester thereof, such as dimethyl terephthalate or dimethyl isophthalate, can be used as the starting material for the polycondensation.

As specific examples of the unsaturated polyester resin obtained by polycondensation between an unsaturated polybasic acid having a reactive double bond and a polyhydric alcohol, there can be mentioned a polyester obtained from maleic anhydride, phthalic anhydride, and propylene glycol; a polyester obtained from maleic anhydride, isophthalic acid, and propylene glycol; a polyester obtained from maleic acid, fumaric acid, isophthalic acid and 1,3-butane diol; a polyester obtained from maleic acid, isophthalic acid and neopentyl glycol; and a polyester obtained from maleic anhydride, tetrahydrophthalic anhydride and dipropylene glycol.

The crosslinking agent is necessary for curing the resin composition of the present invention with active energy rays and imparting a sticking resistance to the cured resin composition. The amount of the crosslinking agent incorporated is 5 to 60% by weight, preferably 6 to 45% by weight, based on the total amount of the polyester resin and the crosslinking agent. If the amount of the crosslinking agent is smaller than 6% by weight, sticking is readily caused. On the other hand, if the amount of the crosslinking agent exceeds 60% by weight, the sticking resistance is satisfactory but the proportion of the polyester resin is reduced and a sufficient color density cannot be obtained.

In view of the curability of the composition by the crosslinking agent and the sticking resistance of the composition, preferably the crosslinking agent comprises at least one polyfunctional monomer. If ultraviolet rays that can be easily handled are used as the active energy rays, preferably the crosslinking agent is a monomer having acryloyloxy or methacryloyloxy groups as the polymerizable group.

As the monomer having an acryloyloxy or methacryloyloxy group, there can be mentioned monomers or oligomers of the polyether acrylate or polyether methacrylate type ["acrylate or methacrylate" will be referred to as "(meth)acrylate" for brevity hereinafter], the polyester (meth)acrylate type, the polyol (meth)acrylate type, the epoxy (meth)acrylate type, the amideurethane (meth)acrylate type, the urethane (meth)acrylate type, the spiroacetal (meth)acrylate type and the polybutadiene (meth)acrylate type.

As specific examples of the monomer or oligomer, there can be mentioned polyether (meth)acrylates such as those synthesized from 1,2,6-hexanetriol, propylene oxide and acrylic acid and from trimethylolpropane, propylene oxide and acrylic acid; polyester (meth)acrylates such as those synthesized from adipic acid, 1,6-hexanediol and acrylic acid and from succinic acid, trimethylolethane and acrylic acid; (meth)acrylates or polyol (meth)acrylates such as triethylene glycol diacrylate, hexapropylene glycol diacrylate, neopentyl glycol diacrylate, 1,4-butane diol dimethacrylate, 2-ethylhexyl acrylate, tetrahydrofurfuryl acrylate, 2-hydroxyethyl methacrylate, ethylcarbitol acrylate, trimethylolpropane triacrylate, pentaerythritol tetra-acrylate, dipentaerythritol tetra-acrylate, dipentaerythritol penta-acrylate, 2,2-bis(4-acryloyloxydiethoxyphenyl)propane, and 2,2-bis(4-acryloyloxypropoxyphenyl)propane; epoxy (meth)acrylates such as those synthesized from diglycidyl-etherified bisphenol A and acrylic acid, from diglycidyl-etherified polybisphenol A and acrylic acid, and from triglycidyl-etherified glycerol and acrylic acid; amideurethane (meth)acrylates such as those synthesized from γ-butyrolactone, N-methylethanolamine, bis(4-isocyanatocyclohexyl)methane and 2-hydroxyethyl acrylate, and from γ-butyrolactone, N-methylethanolamine, 2,6-tolylenediisocyanate, tetraethylene glycol and 2-hydroxyethyl acrylate; urethane acrylates such as 2,6-tolylenediisocyanate diacrylate, isophorone diisocyanate diacrylate, and hexamethylenediisocyanate diacrylate; spiroacetal acrylates such as those synthesized from diallylidene pentaerythritol and 2-hydroxyethyl acrylate; and acrylated polybutadienes such as those synthesized from epoxidized butadiene and 2-hydroxyethyl acrylate. These monomers and oligomers may be used singly or in the form of mixtures of two or more thereof.

Of the above-mentioned monomers and oligomers, compounds represented by the following general formulae (I), (II) and (III) are especially preferred as the crosslinking agent because they have an excellent quick-drying property in air when ultraviolet rays are used as the active energy rays.

(a) Compounds represented by the following general formula (I):

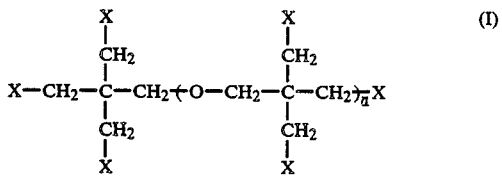

wherein n is an integer of from 1 to 4, at least three of the groups X are groups represented by the general formula $CH_2=CH-COO-R_8-$ (in which $R_8$ represents an alkylene group having 1 to 8 carbon atoms or a polyoxyalkylene group having an alkylene group having 1 to 8 carbon atoms) or the formula $CH_2=CH-COO-$, and the remaining groups X are selected from an alkyl group having 1 to 8 carbon atoms, a hydroxyl group, an amino groups, a group represented by the formula $-(OR_9)_m-H$ (in which $R_9$ represents an alkylene group having 1 to 8 carbon atoms and m is a positive integer) or a group represented by the formula $-(OR_9)_m-OH$ (in which $R_9$ and m are as defined above).

As specific examples of the compound of this type, there can be mentioned dipentaerythritol tetra-acrylate, dipentaerythritol penta-acrylate, dipentaerythritol hexa-acrylate, tripentaerythritol penta-acrylate, tripentaerythritol hexa-acrylate and tripentaerythritol heptaacrylate.

(b) Polybisphenol A polyacrylates represented by the following general formula (II):

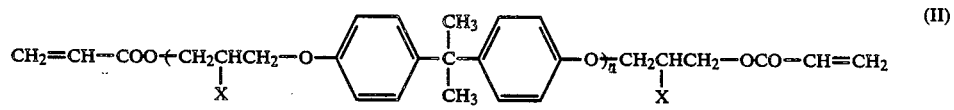

wherein n is a positive integer of from 1 to 10 and X is optionally $-OH$ or $-OCOCH=CH_2$. As specific examples of the compound of this type, there can be mentioned diglycidyl-etherified bisphenol A diacrylate and a diacrylate of Epikote #1001 (n=3, supplied by Shell Chemicals).

(c) Compounds represented by the following general formula (III):

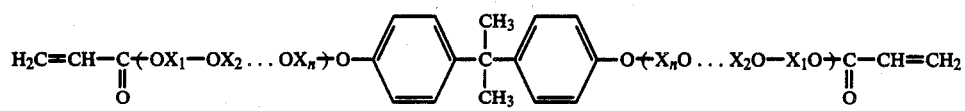

wherein $X_1$, $X_2$, ... and $X_n$, which may be the same or different, represent an alkylene group having up to 6 carbon atoms, in which one hydrogen atom may be substituted by a hydroxyl group, and n is an integer of from 0 to 5.

As specific examples of the compound of this type, there can be mentioned 2,2-bis(4-acryloyloxydiethoxyphenyl)propane, 2,2-bis(4-acryloyloxytriethoxyphenyl)propane and 2,2-bis(4-acryloyloxydipropoxyphenyl)propane.

The silicon-containing surface active agent and/or the fluorine-containing surface active agent is an indispensable component for preventing blocking to a color sheet (transfer paper) when the heat-sensitive transfer is carried out. It has been confirmed that, in order to obtain a color of a high density by a sublimable disperse dye under low energy conditions, the amount of the crosslinking agent must be decreased. However, if the amount of the crosslinking agent is decreased, sticking often occurs. It has been found that if a specific silicon-containing surface active agent or a specific fluorine-containing surface active agent is incorporated in a mixture of a polyester resin and a crosslinking agent in an amount of 0.01 to 12 parts by weight, preferably 0.1 to 10 parts by weight, per 100 parts by weight of the total amount of the polyester resin and the crosslinking agent according to the present invention, sticking can be prominently controlled even when the amount of the crosslinking agent is reduced.

Among the silicon-containing surface active agents, a polydimethylsiloxane/polyoxyalkylene block compound (which may be modified with another functional group) is effective, and a silicon-containing surface active agent of the block compound type in which the ratio of the group $CH_3—(SiO)_{\frac{1}{2}}$— to the group —OR— (in which R represents an alkylene residue) is from 1/10 to 1/0.1, preferably from 1/5 to 1/0.2, is especially preferred because the sticking resistance and the leveling property are greatly improved when the composition is used as a coating material. More unexpectedly, it was found that, if a silicon-containing surface active agent as described above is incorporated in the above-mentioned specific amount, the density of the color formed by dyeing is improved and the transparency of the cured composition is improved. If the amount of the silicon-containing surface active agent incorporated is smaller than 0.01 part by weight, the sticking resistance or the density of the dyed color is degraded and the cured composition becomes opaque. Conversely, if the amount of the silicon-containing surface active agent exceeds 12 parts by weight, the cured composition becomes opaque and the surface becomes sticky.

As specific examples of the silicon-containing surface active agent, there can be mentioned compounds represented by the following general formula (IV):

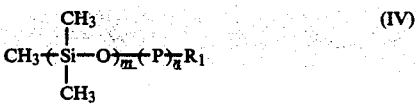

wherein P is

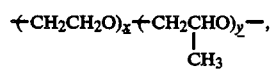

m and n represent a positive integer of at least 1, x and y represent 0 or an integer of at least 1, with the proviso that m, n, x and y satisfy the requirement of $$\frac{1}{10} \leq \frac{2m+1}{nx+ny} \leq 10,$$

and $R_1$ represents an alkyl group, an acyl group, an aryl group or an acetoxy group, and compounds represented by the following general formula (V):

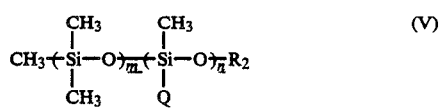

wherein Q represents $+CH_2)_{\overline{z}}O+CH_2CH_2O)_{\overline{x}}(CH_2CHO)_{\overline{y}}R_3$, m and n represent a positive integer of at least 1, x and y represent 0 or an integer of at least 1 and z is 0 or an integer of from 1 to 5, with the proviso that m, n, x and y satisfy the requirement of $$\frac{1}{10} \leq \frac{2m+n+1}{nx+ny} \leq 10,$$

$R_2$ represents

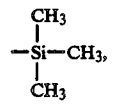

—H, an alkyl group, an acyl group or an aryl group, and $R_3$ represents —H, an alkyl group, an aryl group or an acetoxy group. These compounds may be used singly or in the form of mixtures of two or more thereof.

At least one member selected from non-ionic, anionic, cationic and amphoteric fluorine-containing surface active agents which are soluble to some extent in the mixture of the polyester resin and the crosslinking agent and show a sticking-preventing property can be used as the fluorine-containing surface active agent. As specific examples of the fluorine-containing surface active agent, there can be mentioned anionic surface active agents such as fluoroalkoxypolyfluoroalkyl sulfates, fluorocarbon-sulfonic acid salts and fluorocarbon-carboxylic acid salts; cationic surface active agents such as N-fluoroalkylsulfonamide alkylamine quaternary ammonium salts, N-fluoroalkylsulfonamide alkylamine salts, N-fluoroalkylamide alkylamine quaternary ammonium salts, N-fluoroalkylamide alkylamine salts and N-fluoroalkylsulfonamide alkylhalomethyl ether quaternary ammonium salts; non-ionic surface active agents such as fluorocarbon sulfonamides, fluorocarbon aminosulfonamides, fluorocarbon carboxysulfonamides, fluorocarbon hydroxysulfonamides, fluorocarbon sulfonamide/ethylene oxide adducts, fluorocarbon hydroxysulfonamide sulfates, fluorocarbon amino acid amides, fluorocarboxylic acid amides, fluorocarbon hydroxy-acid amides, fluorocarbon acid amide/ethylene oxide addition condensates, fluorocarbon hydroxy-acid amide sulfates, fluorocarbon hydroxy-acid amide phosphates, fluorocarbon sulfonic acids, fluorohydrocarbon carboxylic acids, fluorohydrocarbon alkyl esters, fluorohydrocarbon alkyl ethers, fluorohydrocarbon carboxyalkyl esters, fluorocarbon hydroxyamides, fluorohydrocarbon alkyl sulfates and fluoroalkyldiamines; and amphoteric surface active agents such as alkylamines having a betaine type fluorocarbon sulfonamide linkage and alkylamines having a betaine type fluorocarbon acid amide linkage. In order to improve the leveling property of the composition and prevent the sticking phenomenon, the use of non-ionic surface active agents is preferred.

The fluorine-containing surface active agent is incorporated in an amount of 0.01 to 12 parts by weight per 100 parts by weight of the total amount of the polyester resin and the crosslinking agent. If the amount of the fluorine-containing surface active agent is smaller than 0.01 part by weight, the sticking resistance is degraded, and if the amount incorporated of the fluorine-containing surface active agent exceeds 12 parts by weight, the cured composition becomes opaque or the surface becomes sticky.

The resin composition comprising the above-mentioned polyester resin, crosslinking agent and silicon- or fluorine-containing surface active agent is cured by irradiation with an active enery ray, and the resulting cured composition can be dyed at a high density by a sublimable disperse dye even under low energy conditions and blocking to a color sheet (transfer paper) is not caused at the heat-sensitive transfer step. Therefore, the resin composition can be put to practical use. Most unexpectedly, it was found that if a benzotriazole ultraviolet absorber and a hindered amine light stabilizer are incorporated in specific amounts into this resin composition, the light stability is greatly improved in comparison with the light stability attained by single use of the ultraviolet absorber or light stabilizer, and the heat or moisture stability (color fastness) of the color of the resin composition dyed with a sublimable disperse dye is improved and the resin composition can be dyed at a high density at the dyeing step. Therefore, this resin composition is especially advantageous as an easily-dyeable material to be used for a sublimation type heat-sensitive transfer recording where a high coloration density under low energy conditions and an excellent stability to heat, light and moisture are required.

Although there are many ultraviolet absorbers, if ultraviolet absorbers other than benzotriazole ultraviolet absorbers, for example, benzophenone ultraviolet absorbers such as 2,4-dihydroxybenzophenone and 2-hydroxy-n-octoxybenzophenone or salicyclic acid ester ultraviolet absorbers such as phenyl salicylate and p-tert-butylphenyl salicylate, are used, a sufficient color density, high light stability or high color fastness cannot be obtained. Furthermore, if light stabilizers other than hindered amine light stabilizers, for example, nickel complex light stabilizers such as nickel complex-3,5-di-tert-butyl-4-hydroxybenzyl phosphoric monoethylate (Irgastab ® supplied by Ciba-Geigy), are used, a sufficient color density, good light stability or good color fastness cannot be obtained.

As the benzotriazole ultraviolet adsorber, there can be mentioned 2-(5-methyl-2-hydroxyphenyl)benzotriazole (Tinuvin ®P supplied by Ciba-Geigy), 2-[2-hydroxy-3,5-bis(α,α-dimethylbenzyl)phenyl]-2H-benzotriazole (Tinuvin ® 234 supplied by Ciba-Geiby), 2-(3,5-di-tert-butyl-2-hydroxyphenyl)benzotriazole (Tinuvin ® 320 supplied by Ciba-Geigy), 2-(3-tert-butyl-5-methyl-2-hydroxyphenyl)-5-chlorobenzotriazole (Tinuvin ® 326 supplied by Ciba-Geigy), 2-(3,5-di-tert-butyl-2-hydroxyphenyl)-5-chlorobenzotriazole (Tinuvin ® 327 supplied by ciba-Geigy), and 2-(3,5-di-tert-amyl-2-hydroxyphenyl)benzotriazole (Tinuvin ® 328 supplied by Ciba-Geigy). At least one member selected from these benzotriazole ultraviolet absorbers is used in an amount of 1 to 10 parts by weight per 100 parts by weight of the total amount of the polyester resin and crosslinking agent. If the amount of the ultraviolet absorber is smaller than 1 part by weight, the effect of improving the color density, light stability and color fastness is not satisfactory. On the other hand, if the amount of the ultraviolet absorber exceeds 10 parts by weight, the curability by active energy rays is reduced. Preferably the benzotriazole ultraviolet absorber is incorporated in an amount of 2 to 8 parts by weight per 100 parts by weight of the total amount of the polyester resin and crosslinking agent.

As the hindered amine light stabilizer, there can be mentioned bis(2,2,6,6-tetramethyl-piperidyl)sebacate (Sanol ®LS770 supplied by Sankyo), bis(1,2,2,6,6-pentamethyl-4-piperidyl)sebacate (Sanol ®LS765 supplied by Sankyo), succinic acid/dimethyl-1-(2-hydroxyethyl)-4-hydroxy-2,2,6,6-tetramethylpiperidine polycondensate (Sanol ®LS622LD supplied by Sankyo), poly{[6-(1,1,3,3-tetramethylbutyl)imino-1,3,5-triazin-2,4-diyl][(2,2,6,6-tetramethyl-4-piperidyl)imino]hexamethylene[(2,2,6,6-tetramethyl-4-piperidyl)imino]} (Sanol ®LS944LD supplied by Sankyo) and 1-{2-[3-(3,5-di-tert-butyl-4-hydroxyphenyl)propionyloxy]ethyl}-4-[3-(3,5-di-tert-butyl-4-hydroxyphenyl)propionyloxy]-2,2,6,6-tetramethylpiperidine (Sanol ®LS626 supplied by Sankyo). At least one member selected from these hindered amine light stabilizers is incorporated in an amount of 1 to 10 parts by weight per 100 parts by weight of the total amount of the polyester resin and crosslinking agent. If the amount of the light stabilizer is smaller than 1 part by weight, the effect of improving the color density, the light stability and the color fastness is not satisfactory. If the amount of the light stabilizer is larger than 10 parts by weight, the curability by active energy rays is degraded.

Where a compound having a high polymer solubility and a low viscosity, such as tetrahydrofurfuryl acrylate, is used as a component of the crosslinking agent, the composition of the present invention comprising the above-mentioned components can be directly coated by roll coating, bar coating or blade coating. However, in order to improve the adaptability to the coating operation, preferably a solvent such as ethyl alcohol, methyl ethyl ketone, toluene, ethyl acetate or dimethylformamide is incorporated to adjust the viscosity to an adequate level. In this case, the composition can be easily coated by spray coating, curtain coating, flow coating or dip coating.

Fine inorganic particles having a particle size smaller than several μm, such as those of silica, alumina, talc and titanium oxide, may be incorporated in the composition of the present invention according to need.

The composition of the present invention, which has been coated on a substrate, is cured by active energy rays such as an electron beam or ultraviolet rays to obtain an article easily-dyeable with a sublimable disperse dye. In view of the control of the active energy ray source, the use of ultraviolet rays is preferred. Where ultraviolet rays are used as the active energy rays, preferably a photopolymerization initiator is incorporated in the composition of the present invention in an amount of 0.01 to 10.0 parts by weight per 100 parts by weight of the total amount of the polyester resin and crosslinking agent. As specific examples of the photopolymerization initiator, there can be mentioned carbonyl compounds such as benzoin, benzoin isobutyl ether, benzyldimethyliketal, ethylphenyl glyoxylate, diethoxyacetophenone, 1,1-dichloroacetophenone, 4'-isopropyl-2-hydroxy-2-methylpropiophenone, 1-hydroxycyclohexylphenylketone, benzophenone, benzophenone/diethanolamine, 4,4'-bisdimethylaminobenzophenone, 2-methylthioxanthone, tert-butylanthraquinone and benzyl; sulfur compounds such as tetramethylthiuram monosulfide and tetramethylthiuram disulfide; and peroxides such as benzoyl peroxide and di-tert-butyl peroxide. These compounds can be used singly or in the form of mixtures of two or more thereof.

As the substrate to which the composition of the present invention is applied, there can be mentioned a woven cotton fabric, a polymethyl methacrylate sheet, a polycarbonate sheet, an acrylic lens, a polyester button and a nylon buckle. Film or paper substrates are suitable as the substrate for the production of an easily-dyeable material to be used in the sublimation type heat-sensitive transfer recording process. For example, there can be mentioned plastic films such as a polyester film, a polypropylene film, a polyamide film, and a polyvinyl chloride film; papers composed mainly of wood fibers, such as a coat paper, a baryta paper and an art paper; and papers composed mainly of plastic fibers, such as an acrylic paper, a polypropylene paper, and a polyester paper. In view of the transparency, a polyester film is preferred, and in view of the image quality, a polypropylene paper is preferred.

The paper or film may be directly used, or the paper or film may be subjected to a preliminary treatment such as washing, etching, corona discharge, irradiation with active energy rays, dyeing or printing according to need, before actual use.

The sublimable disperse dye-dyeable composition is uniformly coated on the above-mentioned substrate according to the coating method as described above so that the thickness after curing is 0.5 to 100 μm, preferably 1 to 50 μm.

If the thickness is smaller than 0.5 μm, diffusion of the dye becomes saturated at the midway point and the substrate cannot be dyed at a high density. If the thickness is larger than 100 μm, blocking is often caused at the heating step.

Where it is necessary to store dyed articles in the piled state for a long time, in order to prevent the migration of the dye, preferably the above-mentioned composition is coated only on one surface of the substrate. However, to effectively prevent the migration of the dye, it is especially preferable that a non-migration layer is formed on the surface opposite to the surface coated with the sublimable disperse dye-dyeable composition.

As the composition for forming the non-migration layer, there can be used a coating material comprising 100 parts by weight of a monomer or oligomer mixture comprising the above-mentioned polyfunctional monomer and/or monofunctional monomer and, if necessary, 0.1 to 100 parts by weight of the above-mentioned photopolymerization initiator. In order to completely prevent the migration of the disperse dye, the average number of the polymerizable groups in the monomer or oligomer mixture must be at least 1.5 per molecule. In connection with this coating material, adjustment of the viscosity by a solvent, coating on the substrate and curing can be performed in the same manner as described above with respect to the sublimable disperse dye-dyeable composition.

The present invention will now be described in detail with reference to the following examples. Note, all of "parts" in the examples and comparative examples are by weight.

Referential Example 1 (Formation of Transfer Sheet)

A commercially available transfer paper having a thickness of 60 μm was uniformly coated with a 5% solution of Kaya Set Blue 136 (supplied by Nippon Kayaku) in trichloroethylene to form a transfer sheet.

Referential Example 2 (Dry Heat Transfer Method)

A paper was spread on an ironing stand, an easily-dyeable material was placed on the paper and the transfer sheet prepared in Referential Example 1 was piled thereon. A commercially available paper having a thickness of 85 μm was then piled on the transfer sheet. The assembly was heated at 145° C. for 10 seconds under a compressive force of 1 kg/cm$^2$ by a hot plate.

Referential Example 3 (Evaluation of Sticking Resistance)

When the dyed material was peeled from the transfer sheet after the hot dry transfer described in Referential Example 2, if peeling could be performed easily and smoothly, the sticking resistance was evaluated as "good", and if a certain force was necessary for peeling because of stickiness, the sticking resistance was evaluated as "poor".

Referential Example 4 (Measurement of Color Density)

The light transmission T or reflectance R was measured by a color analyzer (Model 307 supplied by Hitachi Ltd.) and the color density was determined as -logT or -logR.

Referential Example 5 (Evaluation of Light Resistance)

The light resistance was evaluated based on the color different ΔE (measured by a Hunter color difference meter according to JIS Z-8730) before and after the exposure test using a xenon fade-ometer (Model FAL-25AX supplied by Suga Shikenki). For comparison, a blue scale (JIS L-0841) was used.

Referential Example 6 (Evaluation of Color Fastness)

The change of the color density by the exposure in an atmosphere maintained at a temperature of 60° C. and a relative humidity of 60% was evaluated as the percentage based on the color density before the exposure. A negative value indicates that the color density after the exposure was lower than the color density before the exposure.

Examples 1 and 2 and Comparative Examples 1 through 7

A composition shown in Table I was prepared and was uniformly coated on one surface of a transparent polyester film having a thickness of 100 μm (Lumirror, Grade 100, Type S10, supplied by Toray) by the flow coating method, and the coated film was irradiated with ultraviolet rays from a 2-kW high-pressure mercury lamp in air to form a sublimable disperse dye-easily-dyeable material having a thickness of 4 μm. The so-obtained easily-dyeable material was evaluated according to the methods described in Reference Examples 1 through 4. The results are shown in Table I. The adhesiveness of the cured composition to the polyester film was evaluated by the peeling test using an adhesive cellophane tape. It was found that, in the case of the easily-dyeable material of the present invention, the adhesiveness was good and peeling did not occur.

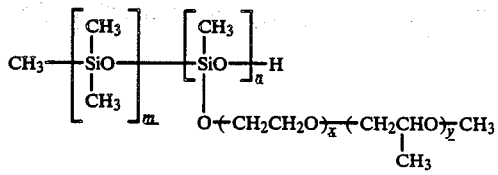

$$\frac{(2m + n + 1)}{(nx + ny)} = 2.5$$

Examples 3 through 6 and Comparative Examples 8 through 21

A composition shown in Table II was prepared and was uniformly coated on one surface of a transparent polyester film having a thickness of 100 μm (Lumirror, Grade 100, Type S10, supplied by Toray) according to the flow coating method, and the coated film was irradi-

TABLE I

| Components of resin composition (parts) | | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Polymer | Polyester resin A | 80 | 60 | | 60 | | 96 | 30 | 80 | 80 |
| | Acrylic resin A | | | 80 | | 60 | | | | |
| Cross-linking agent | 2P6A | 3 | 6 | 3 | 6 | 6 | 0.5 | 15 | 3 | 3 |
| | 2P5A | 4 | 8 | 4 | 8 | 8 | 1 | 10 | 4 | 4 |
| | 2P4A | 3 | 6 | 3 | 6 | 6 | 0.5 | 10 | 3 | 3 |
| | A-DEP | 10 | 20 | 10 | 20 | 20 | 2 | 35 | 10 | 10 |
| Silicon-containing surface active agent A | | 3 | 3 | 3 | 0 | 3 | 3 | 3 | 0.005 | 15 |
| Photo-polymerization initiator | 1-Hydroxy-cyclohex-yl-phenyl-ketone | 5 | 5 | 5 | 5 | 5 | 5 | 5 | 5 | 5 |
| Solvent | Toluene | 300 | 300 | 300 | 300 | 300 | 300 | 300 | 300 | 300 |
| | MEK | 100 | 100 | 100 | 100 | 100 | 100 | 100 | 100 | 100 |
| Results | Color density (−logT) | 0.57 | 0.50 | — | 0.35 | 0.32 | — | 0.21 | — | — |
| | Sticking resistance | Good | Good | Poor | Poor | Good | Poor | Good | Poor | — |
| | Others | | | | White opaque appearance | | | | | Bad appearance (opacified surface) |

Note
2P6A: dipentaerythritol hexa-acrylate
2P5A: dipentaerythritol penta-acrylate
2P4A: dipentaerythritol tetra-acrylate
A-DEP: 2,2-bis(4-acryloyloxydiethoxyphenyl)propane Polyester resin A: resin obtained by polycondensation of tetraphthalic acid and isophthalic acid with ethylene glycol and neopentyl glycol (molecular weight = 15,000 to 20,000, Tg = 65° C.).

Acrylic resin A: copolymer resin composed of butyl methacrylate and methyl methacrylate (Tg = 65° C.).

Silicon-containing surface active agent A:

ated with ultraviolet rays from a 2-kW high-pressure mercury lamp in air to obtain a sublimable disperse dye-easily-dyeable material having a thickness of 5 to 6 μm. The dyeable material was evaluated according to the methods described in Referential Examples 1 through 6. The results are shown in Table II. The adhesiveness of the cured composition to the polyester film was evaluated according to the peeling test using an adhesive cellophane type. In the easily-dyeable material of the present invention, the adhesiveness was good and peeling did not occur.

Note, since the compositions of Comparative Examples 20 and 21 were not sufficiently cured in air, they were cured by irradiation with the ultraviolet rays in nitrogen.

TABLE II

| Components of composition (parts) | Example 3 | Example 4 | Example 5 | Comparative Example 8 | Comparative Example 9 | Comparative Example 10 | Comparative Example 11 | Comparative Example 12 | Comparative Example 13 |
|---|---|---|---|---|---|---|---|---|---|
| Cross-linking agent | | | | | | | | | |
| 2P6A | 3 | 3 | 3 | 3 | 3 | 3 | 3 | 3 | 3 |
| 2P5A | 4 | 4 | 4 | 4 | 4 | 4 | 4 | 4 | 4 |
| 2P4A | 3 | 3 | 3 | 3 | 3 | 3 | 3 | 3 | 3 |
| A-DEP | 10 | 10 | 10 | 10 | 10 | 10 | 10 | 10 | 10 |
| TMPTA*1 | — | — | — | — | — | — | — | — | — |
| Polyester resin A | 80 | 80 | 80 | 80 | 80 | 80 | 80 | 80 | 80 |
| Silicon-containing surface active agent B*5 | 3 | 3 | 3 | 3 | 3 | 3 | 3 | 3 | 3 |
| Additive | | | | | | | | | |
| BHET*2 | — | — | — | — | — | — | — | — | — |
| Ultra-violet absorber | | | | | | | | | |
| 2-(3,5-di-t-butyl-2-Hydroxyphenyl)benzotriazole | 4 | 3 | 5 | 8 | — | 4 | — | — | 4 |
| 2-Hydroxy-n-octoxybenzophenone | — | — | — | — | — | — | — | — | — |
| p-t-Butylphenyl salicylate | — | — | — | — | — | — | — | 4 | — |
| Light Stabilizer | | | | | | | | | |
| Bis(1,2,2,6,6-pentamethyl-4-piperidyl)sebacate | 4 | 5 | 3 | — | 8 | — | 4 | 4 | — |
| Nickel complex-3,5-di-t-butyl-4-hydroxybenzyl phosphate monoethylate | — | — | — | — | — | 4 | — | — | — |
| Photo-polymerization initiator | | | | | | | | | |
| 1-Hydroxycyclohexyl phenyl ketone | 5 | 5 | 5 | 5 | 5 | 5 | 5 | 5 | 5 |
| Solvent | | | | | | | | | |
| Methyl ethyl ketone | 240 | 240 | 240 | 240 | 240 | 240 | 240 | 240 | 240 |
| Toluene | 240 | 240 | 240 | 240 | 240 | 240 | 240 | 240 | 240 |
| Results | | | | | | | | | |
| Sticking resistance | Good | Good | Good | Good | Good | Good | Good | Good | Good |
| Color density (−log T) | 1.08 | 1.05 | 1.04 | 0.73 | 0.75 | 0.69 | 0.82 | 0.83 | 0.85 |
| Light resistance*3 (ΔE) | 4.0 | 4.3 | 4.2 | 12.3 | 9.1 | 13.1 | 8.6 | 9.3 | 26.1 |
| Color fastness*4 (%) | +1 | +1 | +1 | −5 | −4 | −7 | −4 | −4 | −6 |
| Remarks | | | | | | Bad appearance (yellowing, foggy) | | | |

| Components of composition (parts) | Comparative Example 14 | Comparative Example 15 | Comparative Example 16 | Comparative Example 17 | Comparative Example 18 | Comparative Example 19 | Comparative Example 20 | Comparative Example 21 | Example 6 |
|---|---|---|---|---|---|---|---|---|---|
| Cross-linking agent | | | | | | | | | |
| 2P6A | 3 | 3 | 0.3 | 10 | 3 | 3 | — | — | 3 |
| 2P5A | 4 | 4 | 0.4 | 15 | 4 | 4 | — | — | 4 |
| 2P4A | 3 | 3 | 0.3 | 10 | 3 | 3 | — | — | 3 |
| A-DEP | 10 | 10 | 1.0 | 35 | 10 | 10 | — | — | 10 |
| TMPTA*1 | — | — | — | — | — | — | 20 | 80 | — |
| Polyester resin A | 80 | 80 | 98 | 30 | 80 | 80 | 80 | 20 | 80 |
| Silicon-containing surface active agent B*5 | — | 15 | 3 | 3 | 3 | 3 | — | 3 | 3 |
| Additive | | | | | | | | | |
| BHET*2 | — | — | — | — | — | — | — | — | — |

TABLE II-continued

| Ultra-violet absorber | | | | | | | | |
|---|---|---|---|---|---|---|---|---|
| 2-(3,5-Di-t-butyl-2-hydroxyphenyl)benzotriazole | 4 | 4 | 4 | 4 | 0.2 | 15 | — | — |
| 2-Hydroxy-n-octoxybenzophenone | — | — | — | — | — | — | — | — |
| p-t-Butylphenyl salicylate | — | — | — | — | — | — | — | — |
| Light-stabilizer | | | | | | | | |
| Bis(1,2,2,6,6-pentamethyl-4-piperidyl)sebacate | 4 | — | 4 | 4 | 0.2 | 15 | — | — |
| Nickel complex-3,5-di-t-butyl-4-hydroxybenzyl phosphate monoethylate | — | — | — | — | — | — | — | — |
| Photo-polymerization initiator | | | | | | | | |
| 1-Hydroxycyclohexyl phenyl ketone | 5 | 5 | 5 | 5 | 5 | 5 | 5 | 5 |
| Solvent | | | | | | | | |
| Methyl ethyl ketone | 240 | 240 | 240 | 240 | 240 | 240 | 240 | 240 |
| Toluene | 240 | 240 | 240 | 240 | 240 | 240 | 240 | 240 |
| Results | | | | | | | | |
| Sticking resistance | Poor | Poor | Good | Good | Good | Poor | Poor | Good |
| Color density (—logT) | — | — | 0.35 | 0.74 | — | — | 0.11 | 0.53 |
| Light resistance*3 (ΔE) | — | — | 5.5 | 20.2 | — | — | 31.2 | 24.3 |
| Color fastness*4 (%) | — | — | −2 | −4 | — | — | −10 | −6 |
| Remarks | Bad appearance (foggy) | Bad appearance (opaque, sticky) | | | | Insufficient curing, bad appearance (opaque) | Bad appearance (foggy) | |

Note
*1 TMPTA: trimethylolpropane triacrylate
*2 BHET: bis-hydroxyethyl terephthalate
*3 ΔE: measured after 3 days' exposure. In the blue scale, class 3, class 4 and class 5 correspond to ΔE values of 28.0, 4.5 and 6.1, respectively.
*4 Color fastness: measured after 5 days' exposure.
*5 Silicon-containing surface active agent B:

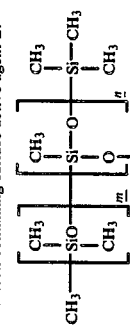

$$\frac{2m + n + 1}{mx} = 1.3$$

Examples 7 through 11

A composition shown in Table III was prepared, and the composition was uniformly coated on one surface of a polyester film having a thickness of 75 μm and an excellent transparency (Lumirror, Grade 75, Type T60, supplied by Toray) by the dip coating method, and the coated film was irradiated with ultraviolet rays from a 2-kW high-pressure mercury lamp in air to obtain a sublimable disperse dye-dyeable material having a thickness of 5 to 6 μm. The dyeable material was evaluated according to the methods described in Referential Examples 1 through 6. The results are shown in Table III. The adhesiveness of the cured composition to the polyester film was evaluated according to the peeling test method using an adhesive cellophane tape. It was found that the material of the present invention had a good adhesiveness and peeling did not occur.

lene paper, and the coated paper was irradiated with ultraviolet rays from a 2-kW high-pressure mercury lamp in air to obtain an article having a layer of the composition of the present invention, which had a thickness of 5 μm. The article was tested according to the methods described in Referential Examples 1 through 6. The composition layer was sufficiently dyed without sticking. The reflection optical density ($-\log R$) was 1.03. The light resistance $\Delta E$ of the dyed article was 4.0 ($\Delta E$ values of the blue scale were the same as described above with reference to Table I), and the color fastness (5 days' exposure) was +1%.

Note

Polyester resin D: resin derived from terephthalic acid, sebacic acid, ethylene glycol and neopentyl glycol (molecular weight=20,000 to 25,000, Tg=10° C.)

Silicon-containing surface active agent D:

TABLE III

| Components of composition (parts) | Example 7 | Example 8 | Example 9 | Example 10 | Example 11 |
|---|---|---|---|---|---|
| Cross-linking agent | | | | | |
| 2P6A | 3 | 3 | 3 | 3 | 3 |
| 2P5A | 4 | 4 | 4 | 4 | 4 |
| 2P4A | 3 | 3 | 3 | 3 | 3 |
| A-DEP | 10 | 10 | 10 | 10 | 10 |
| Poly-ester resin | | | | | |
| B*1 | 80 | 60 | 40 | 20 | 0 |
| C*2 | 0 | 20 | 40 | 60 | 80 |
| Silicon-containing surface active agent C*3 | 5 | 5 | 5 | 5 | 5 |
| Ultraviolet absorber*4 | 5 | 5 | 5 | 5 | 5 |
| Light stabilizer*5 | 5 | 5 | 5 | 5 | 5 |
| Photopolymerization initiator*6 | 6 | 6 | 6 | 6 | 6 |
| Solvent Methyl ethyl ketone | 400 | 400 | 400 | 400 | 400 |
| Toluene | 100 | 100 | 100 | 100 | 100 |
| Results Sticking resistance | Good | Good | Good | Good | Good |
| Color density ($-\log T$) | 1.10 | 1.15 | 1.14 | 1.10 | 1.08 |
| Light resistance ($\Delta E$)*7 | 4.2 | 3.5 | 3.8 | 3.8 | 4.1 |
| Color fastness (%)*8 | +1 | +3 | +3 | +2 | +1 |

Note
*1Polyester resin B: resin obtained by polycondensation of terephthalic acid, isophthalic acid and sebacic acid with ethylene glycol and neopentyl glycol (molecular weight = 20,000 to 25,000, Tg = 10° C.)
*2Polyester resin C: resin obtained by polycondensation of terephthalic acid, isophthalic acid and sebacic acid with ethylene glycol, neopentyl glycol and 1,4-butanediol (molecular weight = 15,000 to 20,000, Tg = 45° C.)
*3Silicon-containing surface active agent C:

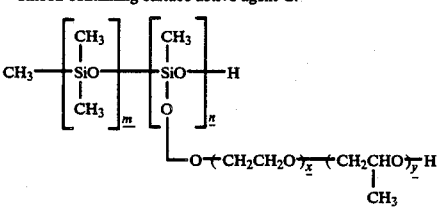

$$\frac{2m + n + 1}{nx + ny} = 2.3$$

*4Ultraviolet absorber: 2-(3,5-di-t-butyl-2-hydroxyphenyl)-5-chlorobenzotriazole
*5Light stabilizer: bis-(2,2,6,6-tetramethyl-4-piperidyl) sebacate
*6Photopolymerization ititiator: 2-hydroxy-2-methylpropiophenone
*7$\Delta E$: measured after 3 days' exposure. In the blue scale, class 3, class 4 and class 5 correspond to $\Delta E$ values of 28.0, 4.5, and 6.1, respectively.
*8Color fastness: measured after 5 days' exposure.

Example 12

A composition comprising 75 parts of a polyester resin D, 10 parts of a diacrylate of a diglycidyl-etherified bisphenol A/acrylic acid adduct, 5 parts of 2P6A, 5 parts of 2P5A, 5 parts of 2P4A, 5 parts of a silicon-containing surface active agent D, 6 parts of benzyldimethylketal as the photopolymerization initiator, 5 parts of 2-(3,5-di-t-butyl-2-hydroxyphenyl)benzotriazole, 5 parts of bis-(2,2,6,6-pentamethyl-4-piperidyl) sebacate, 300 parts of toluene, and 100 parts of methyl ethyl ketone was uniformly coated on one surface of a propy-

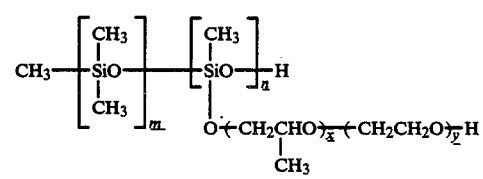

$$\frac{2m + n + 1}{nx + ny} = 0.35$$

Example 13

One surface of a coat paper was uniformly coated with a composition comprising 20 parts of the polyester resin A, 50 parts of the polyester resin D, 5 parts of 2P6A, 5 parts of 2P5A, 5 parts of 2P4A, 15 parts of 2,2-bis(4-acryloyloxydipropoxyphenyl)propane, 4 parts of the silicon-containing surface active agent B, 6 parts of 2-(3,5-di-tert-butyl-2-hydroxyphenyl)benzotriazole, 6 parts of bis-(2,2,6,6-tetramethyl-4-piperidyl) sebacate, 5 parts of 2-hydroxy-2-methylpropiophenone, 250 parts of toluene, 250 parts of methyl ethyl ketone and 50 parts of silica (Aerosil R-972 supplied by Nippon Aerosil) by the blade coating method to form a coating layer having a thickness of 10 μm, and the coated paper was cured in air by irradiation with ultraviolet rays. The resulting coated paper was subjected to dry heat transfer and evaluated according to the methods described in Referential Examples 1 through 6. The coated paper was sufficiently dyed without sticking and the color density (−log R) was 0.96. The light resistance and color fastness were evaluated according to the methods described in Referential Example 5 (3 days' exposure) and Referential Example 6 (5 days' exposure), respectively. The value ΔE was 3.7 (the ΔE values of the blue scale were the same as described above with reference to Table I) and the color fastness was +1%.

Example 14

A composition comprising 75 parts of the polyester resin D, 10 parts of a diacrylate of a diglycidyl-etherified bisphenol A/acrylic acid adduct, 5 parts of 2P6A, 5 parts of 2P5A, 5 parts os 2P4A, 5 parts of the silicon-containing surface active agent D, 6 parts of benzylmethylketal as the photopolymerization initiator, 5 parts of 2-(3,5-di-tert-butyl-2-hydroxyphenyl)benzotriazole, 5 parts of bis(1,2,2,6,6-pentamethyl-4-piperidyl) sebacate, 300 parts of toluene and 100 parts of methyl ethyl ketone was spray-coated on a write knitwork, and the composition was cured by irradiation with ultraviolet rays from 2-kW mercury lamp in air and a dry heat transfer was carried out according to the method described in Referential Example 2. The cured composition was sufficiently dyed without sticking. When the dyed article was subjected to the light stability test using a xenon fade-ometer for 1 day, no substantial discoloration was caused. When the obtained dyed article was allowed to stand in an atomosphere maintained at a temperature of 60° C. and a relative humidity of 60% for 5 days, no substantial color fading was caused.

Example 15

A composition comprising 20 parts of the polyester resin A, 50 parts of the polyester resin D, 5 parts of 2P6A, 5 parts of 2P5A, 5 parts of 2P4A, 15 parts of 2,2-bis(4-acryloyloxydipropoxyphenyl)propane, 4 parts of the silicon-containing surface active agent B, 6 parts of 2-(3,5-di-tert-butyl-2-hydroxyphenyl)benzotriazole, 6 parts of bis(2,2,6,6-tetramethyl-4-piperidyl) sebacate, 7 parts of 2-hydroxy-2-methylpropiophenone, 250 parts of toluene, and 250 parts of methyl ethyl ketone was flow-coated on a colorless methacrylic resin plate having a thickness of 1 mm so that the thickness of the coating layer was 7 μm after curing. The composition was cured by irradiation with ultraviolet rays in air, and a dry heat transfer was carried out according to the method described in Referential Example 2. The coating layer was sufficiently dyed without blocking and the color density (−log T) was 1.02. When the light resistance and color fastness of the obtained article were evaluated according to the methods described in Referential Example 5 (3 days' exposure) and Referential Example 6 (5 days' exposure), respectively, it was found that the value ΔE was 3.8 (the values ΔE of the blue scale were the same as described above with reference to Table I) and the color fastness was +2%.

As is apparent from the foregoing description, the sublimable disperse dye-easily-dyeable composition of the present invention can be easily dyed at a high density with a sublimable disperse dye and is far superior to conventional dyeable compositions in coloring property and color sharpness. Moreover, the composition of the present invention has an excellent blocking resistance and high heat resistance and the dry transfer of a disperse dye onto a coating of the composition of the present invention can be accomplished under low energy conditions, that is, at a low temperature for a short time and the obtained dyed article has an excellent light resistance and color fastness. Therefore, an article obtained by coating the composition of the present invention on a substrate and curing the composition by irradiation with active energy rays will be very valuable as a recording material to be used in the sublimation type heat-sensitive transfer recording process for color copying, electrophotography or information recording. A recording material prepared by coating the composition of the present invention on a transparent substrate has a particularly excellent transparency and will be very valuable as the recording material for an overhead projector, from the industrial viewpoint. Furthermore, a plastic molded article (such as a sheet, a lens or a button) or a woven fabric prepared according to the present invention can be easily dyed with a sublimable disperse dye and has an excellent stability. Therefore, this molded article or woven fabric will be very valuable from a practical and an industrial viewpoint.

We claim:

1. A resin composition for a crosslinked coating film easily dyeable with a disperse dye, which comprises 100 parts by weight of a mixture composed of 40 to 95% by weight of a polyester resin and 5 to 60% of a crosslinking agent curable with active energy rays, and 0.01 to 12 parts by weight of at least one surface active agent selected from the group consisting of silicon-containing surface active agents and fluorine-containing surface active agents.

2. The resin composition as set forth in claim 1, wherein the polyester resin is a linear thermoplastic polyester resin obtained by polycondensation of at least one dicarboxylic acid with at least one diol.

3. The resin composition as set forth in claim 1, wherein the crosslinking agent comprises at least one polyfunctional monomer.

4. The resin composition as set forth in claim 1, wherein the crosslinking agent has methacryloyloxy or acryloyloxy groups as the polymerizable group.

5. The resin composition as set forth in claim 1, wherein the main component of the silicon-containing surface active agent is predominantly composed of a polyoxyalkylene-modified polydimethylsiloxane in which the ratio of $CH_3-(SiO)_1-$ to $-OR-$ (in which R represents an alkylene residue) is in the range of from 1/10 to 1/0.1.

6. The resin composition as set forth in claim 1, wherein the active energy rays are ultraviolet rays and a photopolymerization initiator is further incorporated in an amount of 0.01 to 10 parts by weight per 100 parts by weight of the mixture composed of the polyester resin and crosslinking agent.

7. The resin composition as set forth in claim 1, which further comprises 1 to 10 parts by weight of at least one benzotriazole ultraviolet absorber and 1 to 10 parts by weight of at least one hindered amine light stabilizer.

8. The resin composition as set forth in claim 7, wherein the polyester resin is a linear thermoplastic polyester resin obtained by polycondensation of at least one dicarboxylic acid with at least one diol.

9. The resin composition as set forth in claim 7, wherein the crosslinking agent comprises at least one polyfunctional monomer.

10. The resin composition as set forth in claim 7, wherein the crosslinking agent has methacryloyloxy or acryloyloxy groups as the polymerizable group.

11. The resin composition as set forth in claim 7, wherein the main component of the silicon-containing surface active agent is predominantly composed of a polyoxyalkylene-modified polydimethylsiloxane in which the ratio of $CH_3-(SiO)_{\frac{1}{2}}-$ to $-OR-$ (in which R represents an alkylene residue) is in the range of from 1/10 to 1/0.1.

12. The resin composition as set forth in claim 7, wherein the active energy rays are ultraviolet rays and a photopolymerization initiator is further incorporated in an amount of 0.01 to 10 parts by weight per 100 parts by weight of the mixture composed of the polyester resin and crosslinking agent.

13. A coated article comprising a substrate and a crosslinked coating film easily dyeable with a sublimable disperse dye, said crosslinked coating film being formed on the substrate by coating the substrate with a resin composition comprising 100 parts by weight of a mixture composed of 40 to 95% by weight of a polyester resin and 5 to 60% of a crosslinking agent curable with active energy rays, and 0.01 to 12 parts by weight of at least one surface active agent selected from the group consisting of silicon-containing surface active agents and fluorine-containing surface active agents, and then irradiating the coated substrate with active energy rays.

14. The coating article according to claim 13, which further comprises 1 to 10 parts by weight of at least one benzotriazole ultraviolet light absorber and 1 to 10 parts by weight of at least one hindered amine light stabilizer.

15. The coated article according to claim 13, wherein the polyester resin is a linear thermoplastic polyester resin obtained by poly-condensation of at least one dicarboxylic acid with at least one diol.

16. The coated article according to claim 13, wherein the crosslinking agent comprises at least one polyfunctional monomer.

17. The coated article according to claim 13, wherein the crosslinking agent has methacryloyloxy or acryloyloxy groups as the polymerizable group.

18. The coated article according to claim 13, wherein the main component of the silicon-containing surface active agent is predominantly composed of a polyoxyalkylene-modified polydimethylsiloxane in which the ratio of $CH_3-(SiO)_{\frac{1}{2}}-$ to $-OR-$, wherein R represents an alkylene residue, is in the range of from 1/10 to 1/0.1.

19. The coated article according to claim 13, wherein the active energy rays are ultraviolet rays and a photopolymerization initiator is further incorporated in the mixture in an amount of 0.01 to 10 parts by weight per 100 parts by weight of the mixture composed of the polyester resin and crosslinking agent.

20. The coated article according to claim 13, wherein the substrate is a shaped article.

21. The coated article according to claim 13, wherein the substrate is a sheet, film or paper.

22. The coated article according to claim 13, wherein the substrate is a polyester film.

23. The coated article according to claim 13, wherein the substrate is a polypropylene paper.

24. The coated article according to claim 13, wherein the substrate is a coated paper.

25. The coated article according to claim 13, wherein the substrate is a fabric.

26. The coated article according to claim 13, wherein the substrate is a shaped article made of a methacrylic resin.

* * * * *